US011967701B2

United States Patent
Hanazaki et al.

(10) Patent No.: US 11,967,701 B2
(45) Date of Patent: Apr. 23, 2024

(54) POSITIVE ELECTRODE MATERIAL, NON-AQUEOUS ELECTROLYTE SECONDARY BATTERY, AND METHOD OF PRODUCING POSITIVE ELECTRODE MATERIAL

(71) Applicants: Toyota Jidosha Kabushiki Kaisha, Toyota (JP); Panasonic Corporation, Kadoma (JP)

(72) Inventors: Ryo Hanazaki, Kobe (JP); Takashi Ko, Osaka (JP); Natsumi Goto, Hyogo (JP); Sho Tsuruta, Osaka (JP); Kohei Kintsu, Osaka (JP)

(73) Assignees: TOYOTA JIDOSHA KABUSHIKI KAISHA, Toyota (JP); PANASONIC CORPORATION, Kadoma (JP)

( * ) Notice: Subject to any disclaimer, the term of this patent is extended or adjusted under 35 U.S.C. 154(b) by 105 days.

(21) Appl. No.: 17/154,455

(22) Filed: Jan. 21, 2021

(65) Prior Publication Data

US 2021/0234151 A1 Jul. 29, 2021

(30) Foreign Application Priority Data

Jan. 24, 2020 (JP) .................................. 2020-009752
Jan. 20, 2021 (JP) .................................. 2021-006947

(51) Int. Cl.

| H01M 4/133 | (2010.01) |
|---|---|
| C01B 32/162 | (2017.01) |
| H01M 4/04 | (2006.01) |
| H01M 4/131 | (2010.01) |
| H01M 4/134 | (2010.01) |
| H01M 4/1391 | (2010.01) |
| H01M 4/1393 | (2010.01) |
| H01M 4/1395 | (2010.01) |
| H01M 4/36 | (2006.01) |
| H01M 4/02 | (2006.01) |

(52) U.S. Cl.
CPC ........... *H01M 4/133* (2013.01); *C01B 32/162* (2017.08); *H01M 4/0471* (2013.01); *H01M 4/131* (2013.01); *H01M 4/134* (2013.01); *H01M 4/1391* (2013.01); *H01M 4/1393* (2013.01); *H01M 4/1395* (2013.01); *H01M 4/364* (2013.01); *H01M 2004/028* (2013.01)

(58) Field of Classification Search
None
See application file for complete search history.

(56) References Cited

U.S. PATENT DOCUMENTS

| 2015/0024280 A1* | 1/2015 | Uchiyama ............. H01M 4/505 |
|---|---|---|
| | | 429/231.5 |
| 2015/0037680 A1* | 2/2015 | Park ...................... H01M 4/525 |
| | | 252/182.1 |

FOREIGN PATENT DOCUMENTS

| JP | 2014/127235 | * | 7/2014 | .......... H01M 10/052 |
|---|---|---|---|---|
| JP | 2014-127235 A | | 7/2014 | |

OTHER PUBLICATIONS

English translation of JP 2014/127235 (Year: 2014).*

* cited by examiner

*Primary Examiner* — Yoshitoshi Takeuchi
(74) *Attorney, Agent, or Firm* — Dinsmore & Shohl LLP (57) ABSTRACT

A positive electrode material consists of composite particles. Each of the composite particles includes a base material particle, a film, and a carbon nanotube. The film covers at least a part of a surface of the base material particle. The base material particle includes a positive electrode active material. The film includes a boron oxide. The carbon nanotube includes a first portion and a second portion. The first portion is buried in the film. The second portion is exposed on a surface of the film.

9 Claims, 4 Drawing Sheets

POSITIVE ELECTRODE MATERIAL, NON-AQUEOUS ELECTROLYTE SECONDARY BATTERY, AND METHOD OF PRODUCING POSITIVE ELECTRODE MATERIAL

CROSS REFERENCE TO RELATED APPLICATIONS

This nonprovisional application claims priority to Japanese Patent Application No. 2020-009752 filed on Jan. 24, 2020 and No. 2021-006947 filed on Jan. 20, 2021, with the Japan Patent Office, the entire contents of which are hereby incorporated by reference.

BACKGROUND

Field

The present disclosure relates to a positive electrode material, a non-aqueous electrolyte secondary battery, and a method of producing a positive electrode material.

Description of the Background Art

Japanese Patent Laying-Open No. 2014-127235 discloses an amorphous boron oxide coating layer that covers at least a part of a surface of a positive electrode active material particle.

SUMMARY

In a non-aqueous electrolyte secondary battery (which may be simply called "battery" hereinafter), positive electrode active material particles have a high electric potential. Because of this, on surfaces of positive electrode active material particles, oxidative degradation of electrolyte may occur. Oxidative degradation of electrolyte may be a cause of a decrease in cycle life.

For example, forming a boron oxide film on a surface of a positive electrode active material particle is considered. Boron oxide may reduce direct contact between positive electrode active material particles and electrolyte, and thereby enhance cycle life, for example.

Boron oxide may also reduce electronic conduction. Forming a boron oxide film may cause an increase in battery resistance. To reduce the increase in battery resistance, the amount of conductive material (for example, carbon black) in electrode (positive electrode) may be increased. However, conductive material does not contribute to battery capacity. Increasing the amount of conductive material may cause a decrease in battery energy density.

An object of the present disclosure is to efficiently reduce an increase in resistance resulting from formation of a boron oxide film.

In the following, the technical structure and the effects according to the present disclosure are described. It should be noted that the action mechanism according to the present disclosure includes presumption. The scope of claims is not limited by whether or not the action mechanism is correct.

[1] A positive electrode material is for use in a non-aqueous electrolyte secondary battery.

The positive electrode material consists of composite particles. Each of the composite particles includes a base material particle, a film, and a carbon nanotube. The film covers at least a part of a surface of the base material particle. The base material particle includes a positive electrode active material. The film includes a boron oxide. The carbon nanotube includes a first portion and a second portion. The first portion is buried in the film. The second portion is exposed on a surface of the film.

Figure 1:
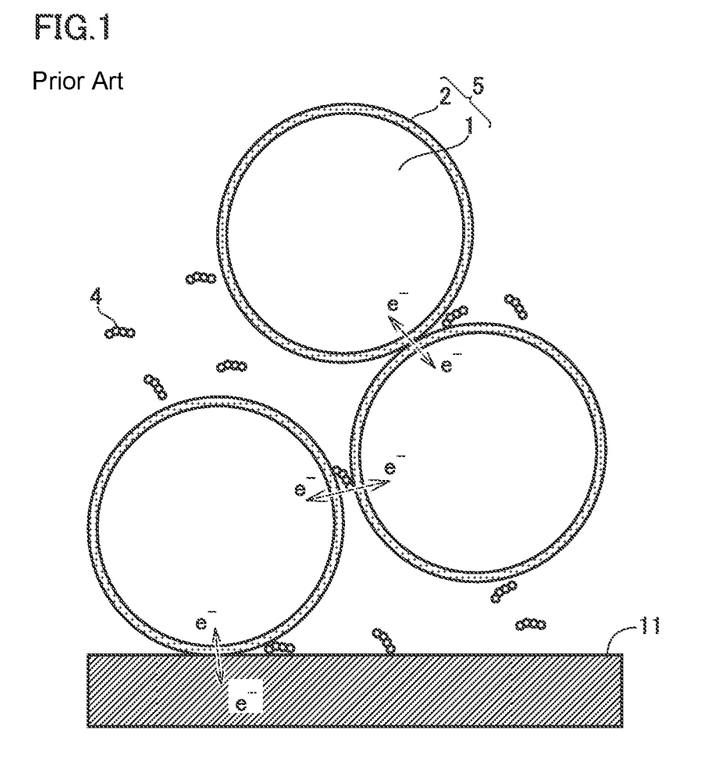
FIG. 1 is a first conceptual view illustrating electronic conduction in an electrode.

FIG. 1 is a first conceptual view illustrating electronic conduction in an electrode. Composite particles 5 are disposed on a surface of a positive electrode current collector 11. Each composite particle 5 includes a base material particle 1 and a film 2. Base material particle 1 includes a positive electrode active material. Film 2 covers a surface of base material particle 1. Film 2 includes a boron oxide. Electrons ($e^-$) move between base material particles 1. Electrons also move between base material particles 1 and positive electrode current collector 11. Film 2 may reduce movement of electrons. As a result, battery resistance may increase.

For electronic conduction paths to be formed, the amount of a conductive material 4 may be increased. However, adding conductive material 4 after formation of film 2 on a surface of base material particle 1 may be less likely to achieve forming electronic conduction paths that connect base material particles 1 to each other. Further, increasing the amount of conductive material 4 may cause a decrease in battery energy density. Therefore, use of conductive material 4 in an attempt to reduce an increase in resistance resulting from film formation may be inefficient.

Figure 2:
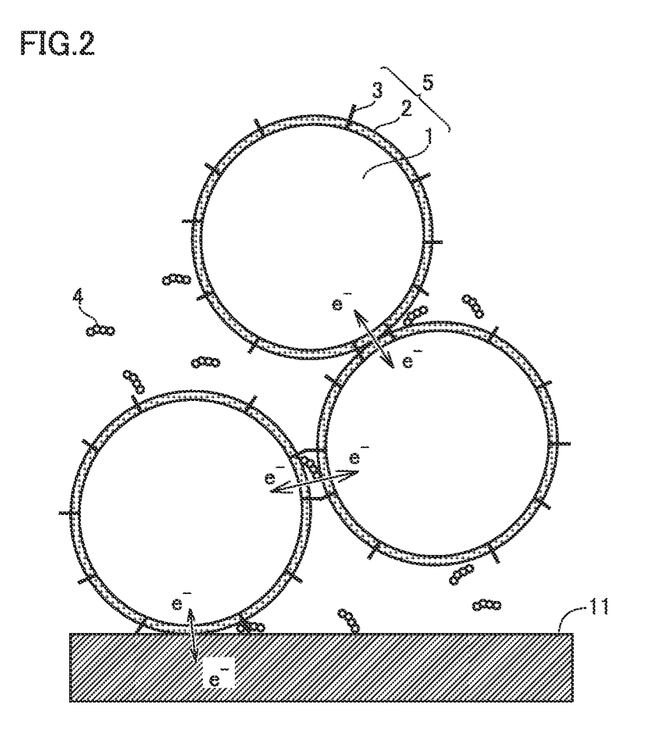
FIG. 2 is a second conceptual view illustrating electronic conduction in an electrode.

FIG. 2 is a second conceptual view illustrating electronic conduction in an electrode.

Composite particle 5 according to the present disclosure includes a carbon nanotube (CNT) 3, in addition to base material particle 1 and film 2. CNT 3 may have a high electronic conductivity. CNT 3 includes a first portion and a second portion. The first portion is buried in film 2. The second portion is exposed on a surface of film 2. CNTs 3 may form electronic conduction paths that connect base material particles 1 to each other. As a result, an increase in resistance resulting from film formation may be reduced efficiently.

[2] A percentage of an amount of substance of boron to a total amount of substance of metal elements other than lithium contained in the positive electrode active material and boron measured by x-ray photoelectron spectroscopy (XPS) may be 80% or higher, for example.

Hereinafter, the "percentage of an amount of substance of boron to a total amount of substance of metal elements other than lithium contained in the positive electrode active material and boron measured by XPS" is also called "boron ratio". The boron ratio serves as an index of a rate of coverage of the base material particle. The higher the boron ratio is, the higher the rate of coverage of the base material particle may be. When the boron ratio is 80% or higher, cycle life may be enhanced.

[3] A percentage of a mass of the carbon nanotube to a mass of the positive electrode active material may be from 0.02% to 0.06%, for example.

Hereinafter, the "percentage of a mass of the carbon nanotube to a mass of the positive electrode active material" is also called "CNT ratio". When the CNT ratio is 0.02% or higher, battery resistance may be reduced. When the CNT ratio is 0.06% or lower, cycle life may be enhanced.

[4] A non-aqueous electrolyte secondary battery includes the positive electrode material according to any one of [1] to [3] above. The battery according to the present disclosure may be excellent in energy density, battery resistance, and cycle life.

[5] A positive electrode material is for use in a non-aqueous electrolyte secondary battery.

A method of producing a positive electrode material includes the following (A) to (C):

(A) mixing base material particles, boric acid, carbon nanotubes, and a solvent to prepare a first precursor;
(B) drying the first precursor to prepare a second precursor; and
(C) heating the second precursor to prepare composite particles.

The positive electrode material consists of the composite particles. Each of the composite particles includes a base material particle, a film, and a carbon nanotube. The film covers at least a part of a surface of the base material particle. The base material particle includes a positive electrode active material. The film includes a boron oxide. The film is formed in such a way that the carbon nanotube includes a first portion and a second portion. The first portion is buried in the film. The second portion is exposed on a surface of the film.

In the configuration in which CNT is mixed during film formation, part of the CNT may be taken inside the film. As a result, part of the CNT may be buried in the film and the remaining part of the CNT may be exposed on a surface of the film.

The foregoing and other objects, features, aspects and advantages of the present disclosure will become more apparent from the following detailed description of the present disclosure when taken in conjunction with the accompanying drawings.

DESCRIPTION OF THE EMBODIMENTS

In the following, embodiments of the present disclosure (hereinafter also called "present embodiment") are described. It should be noted that the description below does not limit the scope of claims. For instance, the below description about the present embodiment takes a lithium-ion battery as an example. However, lithium-ion battery is merely an example of a non-aqueous electrolyte secondary battery. A non-aqueous electrolyte secondary battery may be any battery system as long as it includes a non-aqueous electrolyte. For example, a non-aqueous electrolyte secondary battery may be a sodium-ion battery and/or the like.

In the present embodiment, phrases such as "from 0.02% to 0.06%" mean a range that includes the boundary values, unless otherwise specified. For example, the phrase "from 0.02% to 0.06%" means a range of "not less than 0.02% and not more than 0.06%".

<Positive Electrode Material>

As illustrated in FIG. 2, a positive electrode material according to the present embodiment consists of composite particles 5. In other words, the positive electrode material is a group of particles (powder). For example, the positive electrode material may have a median diameter from 1 μm to 30 μm. For example, the positive electrode material may have a median diameter from 5 μm to 20 μm. The "median diameter" refers to a particle size in volume-based particle size distribution at which the cumulative particle volume (accumulated from the side of small sizes) reaches 50% of the total particle volume. The median diameter may be measured with a laser-diffraction particle size distribution analyzer. Each composite particle 5 includes a base material particle 1, a film 2, and a CNT 3.

<<Base Material Particle>>

Base material particle 1 is the core of composite particle 5. For example, base material particle 1 may have a median diameter from 1 μm to 30 μm. For example, base material particle 1 may have a median diameter from 5 μm to 20 μm.

Base material particle 1 includes a positive electrode active material. Base material particle 1 may consist essentially of a positive electrode active material. The positive electrode active material is a so-called host-guest compound. The guest is lithium (Li). The host structure may include a transition metal element and/or the like, for example. The host structure may include a lamellar rock salt structure, a spinel structure, an olivine structure, and/or the like, for example.

The positive electrode active material may include at least one selected from the group consisting of lithium cobalt oxide, lithium nickel oxide, lithium manganese oxide, lithium nickel cobalt manganese oxide, lithium nickel cobalt aluminate, and lithium iron phosphate, for example.

The positive electrode active material may be doped with various elements. The positive electrode active material may include an impurity element. The composition of the positive electrode active material may be identified by high-frequency inductively coupled plasma atomic emission spectroscopy (ICP-AES).

For example, the positive electrode active material may have a composition represented by the following formula (I):

$$LiMeO_2 \quad (I)$$

In the above formula (I), "Me" denotes a metallic element. "Me" may include at least one selected from the group consisting of nickel (Ni), cobalt (Co), manganese (Mn), and aluminum (Al), for example.

For example, the positive electrode active material may have a composition represented by the following formula (II):

$$LiNi_aCo_bMn_cO_2 \quad (II)$$

In the above formula (II), relations "0<a<1, 0<b<1, 0<c<1, a+b+c=1" may be satisfied, for example. In the above formula (II), relations "0.5<a<1, 0<b<0.5, 0<c<0.5, a+b+c=1" may be satisfied, for example. In the above formula (II), relations "0.7<a<1, 0<b<0.3, 0<c<0.3, a+b+c=1" may be satisfied, for example. In the above formula (II), relations "0.8a<1, 0<b<0.2, 0<c<0.2, a+b+c=1" may be satisfied, for example.

For example, the positive electrode active material may have a composition represented by the following formula (III):

$$LiNi_aCo_bAl_cO_2 \quad (III)$$

In the above formula (III), relations "0.7<a<1, 0<b<0.3, 0<c<0.3, a+b+c=1" may be satisfied, for example.

<<Film>>

Film 2 covers at least a part of a surface of base material particle 1. Film 2 may cover only a part of a surface of base material particle 1. Film 2 may cover substantially the entire surface of base material particle 1. Film 2 may reduce direct contact between base material particle 1 and the electrolyte. In other words, film 2 may reduce oxidative degradation of the electrolyte.

The composition of film 2 may be identified by XPS, for example. Film 2 includes a boron oxide. Film 2 may consist essentially of a boron oxide. The boron oxide refers to a compound including boron (B) and oxygen (O). The boron oxide may consist essentially of B and O. The boron oxide may be crystalline. The boron oxide may be amorphous. The boron oxide may further include other elements as long as it includes B and O. For example, the boron oxide may further include Li. The boron oxide may consist essentially of B, O, and Li. The boron oxide may have any composition ratio. For example, the boron oxide may include lithium borate ($LiBO_2$, $Li_3BO_3$, $Li_2B_4O_7$, and the like).

The percentage of an amount of substance of boron to a total amount of substance of metal elements other than lithium contained in the positive electrode active material and boron ("boron ratio") may be 56% or higher, for example. The boron ratio serves as an index of a rate of coverage of base material particle 1. The higher the boron ratio is, the higher the rate of coverage of base material particle 1 may be. For example, the boron ratio may be 80% or higher. When the boron ratio is 80% or higher, cycle life may be enhanced. For example, the boron ratio may be 81% or higher. For example, the boron ratio may be 82% or higher. For example, the boron ratio may be 91% or higher. For example, the boron ratio may be not higher than 100%. For example, the boron ratio may be not higher than 91%.

The boron ratio is measured by XPS. By XPS, the concentration of boron in the positive electrode material is measured. By XPS, the total concentration of metal elements other than lithium contained in the positive electrode active material and boron in the positive electrode material is measured. For example, when the composition of the positive electrode active material is represented by the above formula (II) "$LiNi_aCo_bMn_cO_2$ ($0<a<1$, $0<b<1$, $0<c<1$, $a+b+c=1$)", the total concentration of metal elements other than lithium contained in the positive electrode active material and boron is equal to the total concentration of Ni, Co, Mn and B. The value of the concentration of boron divided by the total concentration of metal elements other than lithium contained in the positive electrode active material and boron, followed by conversion into percentage, is regarded as the "boron ratio". The boron ratio is calculated by a formula of "boron ratio (%)={B/(Ni+Co+Mn+B)}×100". Measurement of the boron ratio is carried out three times or more. The arithmetic mean of these three or more measurements is used.

The XPS measurement conditions are, for example, as described below.

Apparatus: "PHI 5000 VersaProbe II" manufactured by ULVAC-PHI (or a similar product)
X-ray source: Monochromatic Al Kα ray (1486.6 eV)
Accelerating voltage: 20 kV
Power: 100 W
Measurement mode: Wide scan
Detection angle: 45°

<<Carbon Nanotube>>

CNT 3 includes a first portion and a second portion. The first portion is buried in film 2. The first portion may be in contact with base material particle 1. The second portion refers to the part of CNT 3 that is not the first portion. The second portion is exposed on a surface of film 2. For example, observing composite particle 5 with an STEM (scanning transmission electron microscope) and/or the like allows for checking that CNT 3 includes the first portion and the second portion.

CNT 3 may have a high electronic conductivity. CNTs 3 may form electronic conduction paths that connect base material particles 1 to each other. For example, CNT 3 may be an SWCNT (single-walled carbon nanotube). For example, CNT 3 may be a DWCNT (double-walled carbon nanotube). For example, CNT 3 may be an MWCNT (multi-walled carbon nanotube).

For example, CNT 3 may have a diameter from 1 nm to 100 nm. For example, CNT 3 may have a diameter from 2 nm to 4 nm. The diameter of CNT 3 may be measured by an HRTEM (high-resolution transmission electron microscope). The diameter measurement is carried out for ten or more CNTs 3. The arithmetic mean of these ten or more measurements is used.

For example, the length of CNT 3 may be shorter than the median diameter of base material particle 1. For example, the length of CNT 3 may be 0.1 times to 0.5 times the median diameter of base material particle 1. For example, the length of CNT 3 may be from 1 μm to 10 μm. For example, the length of CNT 3 may be from 1 μm to 5 μm. For example, the length of CNT 3 may be from 2 μm to 4 μm. The length of CNT 3 may be measured with a TEM or an SEM (scanning electron microscope). The length measurement is carried out for ten or more CNTs 3. The arithmetic mean of these ten or more measurements is used.

The percentage of a mass of the carbon nanotube to a mass of the positive electrode active material ("CNT ratio") may be from 0.01% to 0.07%, for example. The CNT ratio may be from 0.02% to 0.06%, for example. When the CNT ratio is 0.02% or higher, battery resistance may be reduced. When the CNT ratio is 0.06% or lower, cycle life may be enhanced. The CNT ratio may be 0.04% or higher, for example. The CNT ratio may be 0.04% or lower, for example.

<Non-aqueous Electrolyte Secondary Battery>

Figure 3:
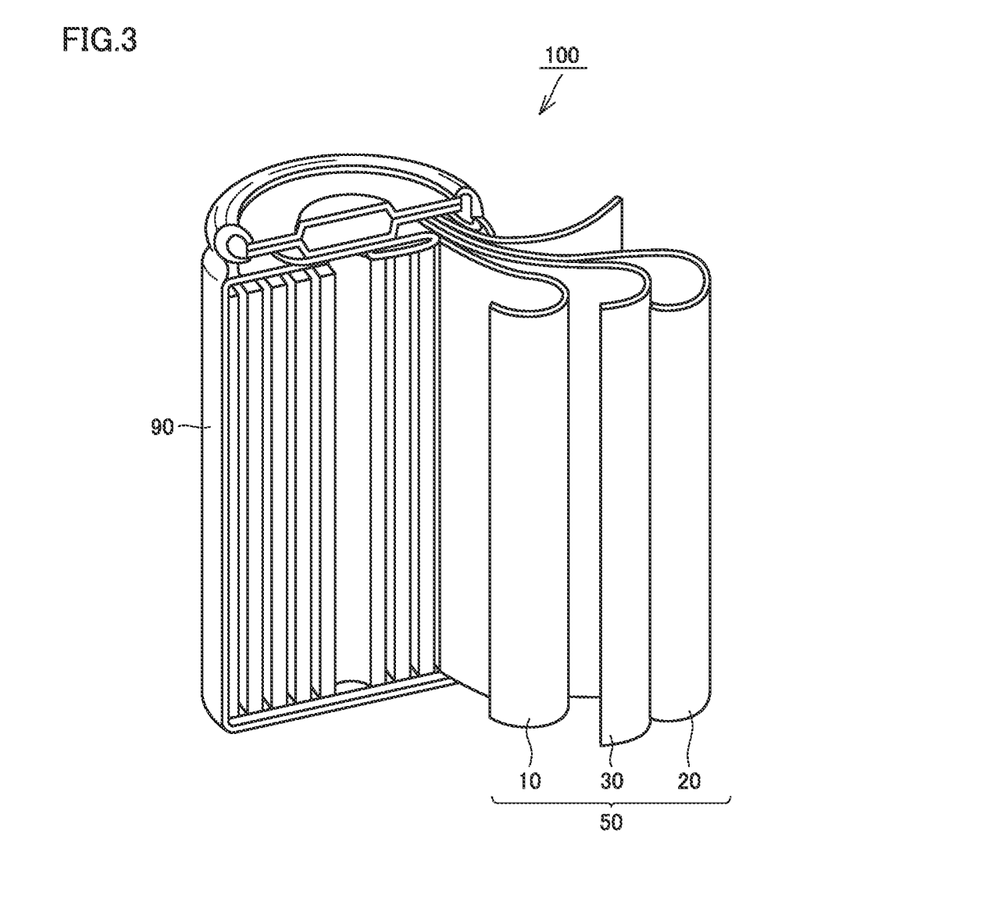
FIG. 3 is a schematic view illustrating an example of a non-aqueous electrolyte secondary battery according to the present embodiment.

FIG. 3 is a schematic view illustrating an example of a non-aqueous electrolyte secondary battery according to the present embodiment.

A battery 100 includes a case 90. Case 90 has a cylindrical outer profile. However, this cylindrical outer profile is merely an example. Case 90 may have a prismatic outer profile, for example. Case 90 may be made of metal, for example. Case 90 may be made of resin, for example. Case 90 may be a pouch made of an aluminum-laminated film and/or the like, for example.

Case 90 accommodates a power storage element 50 and an electrolyte. Case 90 may be hermetically sealed. Power storage element 50 includes a positive electrode 10, a separator 30, and a negative electrode 20. Power storage element 50 is a wound-type one. Power storage element 50 is formed by winding a belt-shaped electrode in a spiral manner. Power storage element 50 may be a stack-type one. Power storage element 50 may be formed by stacking three or more sheet-shaped electrodes.

<<Positive Electrode>>

Positive electrode 10 may be in sheet form. Positive electrode 10 may have a thickness from 10 μm to 200 μm, for example. Positive electrode 10 includes a positive electrode material. In other words, battery 100 includes a positive electrode material. Positive electrode 10 may include a conductive material, a binder, a positive electrode current collector, and the like, in addition to the positive electrode material. Positive electrode 10 may be formed by applying a slurry, for example. More specifically, a positive electrode slurry may be prepared by mixing the positive electrode material, the conductive material, the binder, a dispersion medium, and the like, and the resulting positive electrode slurry may be applied to a surface of the positive electrode current collector, followed by drying, and thereby positive electrode 10 may be formed.

The positive electrode current collector may include an Al foil and/or the like, for example. The positive electrode current collector may have a thickness from 5 μm to 50 μm, for example.

The conductive material may include any component. The conductive material may include at least one selected from the group consisting of carbon black and graphene flake, for example. The carbon black may include acetylene black and/or the like, for example. The amount of the conductive material may be, for example, from 0.1 parts by mass to 10 parts by mass relative to 100 parts by mass of the positive electrode material.

The binder may include any component. The binder may include at least one selected from the group consisting of polyvinylidene difluoride, vinylidene difluoride-hexafluoropropylene copolymer (PVdF-HFP), and tetrafluoroethylene (PTFE), for example. The amount of the binder may be, for example, from 0.1 parts by mass to 10 parts by mass relative to 100 parts by mass of the positive electrode material.

<<Negative Electrode>>

Negative electrode 20 may be in sheet form. Negative electrode 20 may have a thickness from 10 μm to 200 μm, for example. Negative electrode 20 includes a negative electrode active material. Negative electrode 20 may include a conductive material, a binder, a negative electrode current collector, and the like in addition to the negative electrode active material. Negative electrode 20 may be formed by applying a slurry, for example. More specifically, a negative electrode slurry may be prepared by mixing the negative electrode active material, the conductive material, the binder, a dispersion medium, and the like, and the resulting negative electrode slurry may be applied to a surface of the negative electrode current collector, followed by drying, and thereby negative electrode 20 may be formed.

The negative electrode active material may include any component. The negative electrode active material may include at least one selected from the group consisting of graphite, soft carbon, hard carbon, silicon (Si), silicon oxide (SiO), silicon-based alloy, tin (Sn), tin oxide (SnO), tin-based alloy, and lithium titanium oxide, for example.

The negative electrode current collector may include a copper (Cu) foil and/or the like, for example. The negative electrode current collector may have a thickness from 5 μm to 50 μm, for example.

The conductive material may include any component. The conductive material may include carbon black and/or the like, for example. The amount of the conductive material may be, for example, from 0.1 parts by mass to 10 parts by mass relative to 100 parts by mass of the negative electrode active material.

The binder may include any component. The binder may include at least one selected from the group consisting of carboxymethylcellulose (CMC), styrene-butadiene rubber (SBR), and polyacrylic acid (PAA), for example. The amount of the binder may be, for example, from 0.1 parts by mass to 10 parts by mass relative to 100 parts by mass of the negative electrode active material.

<<Separator>>

Separator 30 is in film form. Separator 30 may have a thickness from 5 μm to 30 μm, for example. Separator 30 is interposed between positive electrode 10 and negative electrode 20. Separator 30 physically separates positive electrode 10 from negative electrode 20. Separator 30 is electrically insulating. Separator 30 may be made of polyolefin, for example. Separator 30 permits permeation of Li ions therethrough. Separator 30 is porous. Separator 30 may have a porosity from 30% to 60%, for example. The porosity may be measured by mercury porosimetry.

Separator 30 may have a monolayer structure. For example, separator 30 may consist of a polyethylene (PE) layer. Separator 30 may have a multilayer structure. For example, separator 30 may have a three-layer structure. Separator 30 may be formed by stacking a polypropylene (PP) layer, a PE layer, and a PP layer in this order.

<<Electrolyte>>

The electrolyte is a Li-ion conductor. The electrolyte may be liquid, gel, or solid. The solid electrolyte may also function as a separator.

The electrolyte may include a solvent and a supporting salt, for example. The solvent is aprotic. The solvent may dissolve the supporting salt. The solvent may include at least one selected from the group consisting of fluoroethylene carbonate (FEC), ethylene carbonate (EC), propylene carbonate (PC), butylene carbonate (BC), ethyl methyl carbonate (EMC), dimethyl carbonate (DMC), and diethyl carbonate (DEC), for example.

The supporting salt may include at least one selected from the group consisting of $LiPF_6$, $LiBF_4$, and $Li(FSO_2)_2N$, for example. The concentration of the supporting salt may be from 0.5 mol/L to 2 mol/L, for example.

The electrolyte may further include various additives, in addition to the solvent and the supporting salt. The additives may include at least one selected from the group consisting of vinylene carbonate (VC), vinylethylene carbonate (VEC), 1,3-propane sultone (PS), cyclohexylbenzene (CHB), tert-amylbenzene (TAB), and lithium bis(oxalato)borate (Li-BOB), for example.

<Method of Producing Positive Electrode Material>

Figure 4:
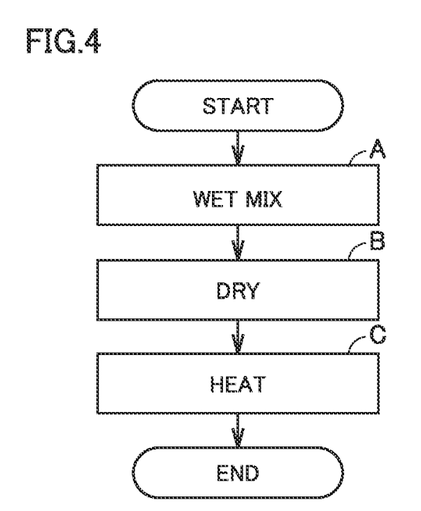
FIG. 4 is a schematic flowchart illustrating a method of producing a positive electrode material according to the present embodiment.

FIG. 4 is a schematic flowchart illustrating a method of producing a positive electrode material according to the present embodiment.

The method of producing a positive electrode material includes "(A) wet mixing", "(B) drying", and "(C) heating".

<<(A) Wet Mixing>>

The method of producing a positive electrode material includes mixing base material particles 1, boric acid, CNTs 3, and a solvent to prepare a first precursor.

Base material particles 1 (powder) are prepared. The details of base material particle 1 are as described above. Each base material particle 1 includes a positive electrode active material.

CNTs 3 are prepared. Powder of CNTs 3 may be prepared. For example, a dispersion of CNTs 3 may be prepared. The dispersion medium of the dispersion may include water and/or the like, for example. The dispersion may include a dispersant. The dispersant may include polyvinylpyrrolidone (PVP) and/or the like, for example. Sometimes, a plurality of CNTs 3 can aggregate and form a bundle. For example, the dispersion may be prepared with use of a bead mill and/or the like. For example, in the bead mill, the bundle may be disaggregated in the co-presence of PVP. As the bundle is being loosened, CNTs 3 may be cut at the same time. Before being cut, CNT 3 may have a length from 10 μm to 100 μm, for example. Before being cut, CNT 3 may have a length from 10 μm to 30 μm, for example. After being cut, CNT 3 may have a length from 1 μm to 10 μm, for example. After being cut, CNT 3 may have a length from 1 μm to 5 μm, for example. After being cut, CNT 3 may have a length from 2 μm to 4 μm, for example. The amount (mass) of CNT 3 may be, for example, from 0.01% to 0.07% of the mass of the positive electrode active material.

Boric acid is a raw material of film 2 (boron oxide). Boric acid may include o-boric acid ($H_3BO_3$) and/or the like, for example. The amount (amount of substance) of boric acid may be, for example, from 0.1% to 10% of the amount of substance of the positive electrode active material. The amount of boric acid may be, for example, from 0.5% to 2% of the amount of substance of the positive electrode active material.

The solvent is prepared. In the present embodiment, a solvent capable of dissolving boric acid is selected. The solvent may include water, ethanol, glycerol, and/or the like, for example. The solvent may consist essentially of water.

Base material particle 1, boric acid, CNT 3, and the solvent are mixed with any stirrer and/or the like. The mixing conditions may be adjusted so that a liquid component and CNT 3 evenly adhere to a surface of base material particle 1. By the mixing, a first precursor (wet mixture) is prepared.

<<(B) Drying>>

The method of producing a positive electrode material includes drying the first precursor to prepare a second precursor.

The first precursor may be dried by any method. For example, the first precursor may be air-dried. For example, a dryer and/or the like may be used. The drying conditions are adjusted so that the solvent included in the first precursor is substantially completely vaporized. By the drying, a second precursor (dry mixture) is prepared.

<<(C) Heating>>

The method of producing a positive electrode material includes heating the second precursor to prepare composite particles 5.

For example, an electric furnace and/or the like may be used. The heating atmosphere may be air and/or the like, for example. By the heating, the second precursor is baked. Thus, a boron oxide is produced on a surface of base material particle 1. In other words, film 2 is formed on a surface of base material particle 1. The heating temperature may be from 160° C. to 300° C., for example. After heating, aggregates of composite particles 5 may be disaggregated, for example. A plurality of composite particles 5 make up a positive electrode material. In other words, the positive electrode material consists of a plurality of composite particles.

In the present embodiment, CNT 3 is mixed with the raw material of film 2. As a result, film 2 may be formed in such a way that CNT 3 includes a first portion and a second portion. The first portion is buried in film 2. The second portion is exposed on a surface of film 2.

EXAMPLES

Next, examples according to the present disclosure (herein also called "the present example") are described. It should be noted that the description below does not limit the scope of claims.

Example 1

<Producing Positive Electrode Material>
<<(A) Wet Mixing>>
Materials described below were prepared.
Base material particle: Positive electrode active material ($LiNi_{0.8}Co_{0.1}Mn_{0.1}O_2$)

Boric acid: $H_3BO_3$
CNT: SWCNT (with a diameter from 2 nm to 4 nm and a length from 10 μm to 30 μm)
Solvent: Water The base material particles, the boric acid, the carbon nanotubes, and the solvent were mixed to prepare a first precursor. The amount (amount of substance) of boric acid was 1% of the amount of substance of the positive electrode active material.

<<(B) Drying>>

A dryer was used to dry the first precursor. Thus, a second precursor was prepared.

<<(C) Heating>>

An electric furnace was used to heat the second precursor. The heating atmosphere was air. The heating temperature was 250° C. Thus, composite particles 5 were formed. Aggregates of composite particles 5 were disaggregated. Thus, a plurality of composite particles 5 were formed. In other words, a positive electrode material was produced. In Example 1, CNTs were mixed during "film formation".

<<Boron Ratio Measurement>>

The boron ratio of the positive electrode material was measured by XPS. In the present example, the percentage of the concentration of B to the total concentration of Ni, Co, Mn and B was regarded as the "boron ratio".

<Producing Non-Aqueous Electrolyte Secondary Battery>

<<Producing Positive Electrode>>
Materials described below were prepared.
Conductive material: Acetylene black
Binder: PVdF
Dispersion medium: N-methyl-2-pyrrolidone
Positive electrode current collector: Al foil (thickness, 15 μm)

The positive electrode material obtained in the above manner, the conductive material, the binder, and the dispersion medium were mixed to prepare a positive electrode slurry. The resulting positive electrode slurry was applied to a surface of the positive electrode current collector, followed by drying, and thereby a positive electrode was produced. The material formulation was "(positive electrode material)/(conductive material)/binder=96.3/2.5/1.2 (mass ratio)".

<<Producing Negative Electrode>>
Materials described below were prepared.
Negative electrode active material: Graphite
Binder: "CMC/SBR=1/1 (mass ratio)"
Dispersion medium: Water
Negative electrode current collector: Cu foil (thickness, 10 μm)

The negative electrode active material, the binder, and the dispersion medium were mixed to prepare a negative electrode slurry. The resulting negative electrode slurry was applied to a surface of the negative electrode current collector, followed by drying, and thereby a negative electrode was produced. The material formulation was "(negative electrode active material)/binder=100/2 (mass ratio)".

<<Assembling>>

A separator was prepared. The separator had a three-layer structure. The separator was formed by stacking a PP layer, a PE layer, and a PP layer in this order.

A power storage element was assembled. The power storage element was a wound-type one. The power storage element included the positive electrode, the negative electrode, and the separator. A cylindrical case was prepared. The power storage element was placed in the case.

An electrolyte was prepared. The electrolyte included the components listed below.

Solvent: "EC/DMC/EMC=3/4/3 (volume ratio)"
Supporting salt: LiPF$_6$ (concentration, 1 mol/L)
Additive: VC (concentration, 2 mass %)

The electrolyte was injected into the case. After the electrolyte was injected, the case was hermetically sealed. Thus, a battery was produced. The battery was cylindrical, with 18650 size (diameter, 18 mm; height, 65 mm). The design capacity of the battery was 1 Ah.

Example 2 to Example 7

A positive electrode material and then a non-aqueous electrolyte secondary battery were produced in the same manner as in Example 1 except that the "boron ratio" and the "CNT ratio" were changed as specified in Table 1 below.

Comparative Example 1

In Comparative Example 1, raw base material particles without any treatment were used as a positive electrode material. Except this, the same manner as in Example 1 was adopted to produce a battery.

Comparative Example 2

A positive electrode material and then a battery were produced in the same manner as in Example 1 except that CNT was not used.

Comparative Example 3

As in Comparative Example 2, a positive electrode material without CNT was produced. The resulting positive electrode material, CNT, acetylene black, the binder, and the dispersion medium were mixed to prepare a positive electrode slurry. The resulting positive electrode slurry was applied to the positive electrode current collector, followed by drying, and thereby a positive electrode was produced. Except this, the same manner as in Comparative Example 2 was adopted to produce a battery. In Comparative Example 3, CNTs were mixed during "positive electrode slurry preparation".

Comparative Example 4

As in Comparative Example 1, raw base material particles without any treatment were used as a positive electrode material. Except this, the same manner as in Comparative Example 3 was adopted to produce a battery. In Comparative Example 4, CNTs were mixed during "positive electrode slurry preparation". In Comparative Example 3 and Comparative Example 4, the material formulation was "(positive electrode material)/(CNT+acetylene black)/binder=96.3/2.5/1.2 (mass ratio)".

<Evaluation>
<<Battery Resistance>>

In the present example, "1 C" refers to a current rate at which full charge capacity is discharged in one hour.

The SOC (state of charge) of the battery was adjusted to 50%. After the SOC adjustment, in an environment at a temperature of 25° C., the battery was discharged at a discharge current of 10 C for ten seconds. The level of voltage drop caused in the ten seconds following the start of discharging was measured. The level of voltage drop was divided by the discharge current to obtain battery resistance.

<<Cycle Test>>

In an environment at a temperature of 25° C., 100 cycles of charge and discharge were carried out. A single cycle consisted of a sequence of charging in a constant current-constant voltage mode (CCCV) and discharging in a constant-current mode (CC). The conditions for CCCV charging and CC discharging are as follows.

CCCV Charging: Charge current=0.5 C, Cut-off voltage=4.2 V, Cut-off current=0.05 C CC Discharging: Discharge current=0.5 C, Cut-off voltage=3.0 V The capacity retention was determined. The capacity retention refers to a percentage of $100^{th}$-cycle discharged capacity to $1^{st}$-cycle discharged capacity. The capacity retention is listed in Table 1 below. The higher the capacity retention is, the more excellent the cycle life may be.

TABLE 1

| | Composite particle | | | Production | Evaluation | |
|---|---|---|---|---|---|---|
| | Base material particle Positive electrode active material | Film Boron ratio[1] [%] | CNT CNT ratio[2] [%] | method CNT mixing timing | Discharge test Battery resistance [mΩ] | Cycle test Capacity retention [%] |
| Comp. Ex. 1 | Li(Ni$_{0.8}$Co$_{0.1}$Mn$_{0.1}$)O$_2$ | 0 | 0 | — | 42.9 | 95.6 |
| Comp. Ex. 2 | Li(Ni$_{0.8}$Co$_{0.1}$Mn$_{0.1}$)O$_2$ | 81 | 0 | — | 44.3 | 97.6 |
| Comp. Ex. 3 | Li(Ni$_{0.8}$Co$_{0.1}$Mn$_{0.1}$)O$_2$ | 80 | 0.02 | Positive electrode slurry preparation | 44 | 97.6 |
| Comp. Ex. 4 | Li(Ni$_{0.8}$Co$_{0.1}$Mn$_{0.1}$)O$_2$ | 0 | 0.02 | Positive electrode slurry preparation | 42.1 | 95.5 |
| Ex. 1 | Li(Ni$_{0.8}$Co$_{0.1}$Mn$_{0.1}$)O$_2$ | 82 | 0.02 | Film formation | 42.5 | 98.0 |
| Ex. 2 | Li(Ni$_{0.8}$Co$_{0.1}$Mn$_{0.1}$)O$_2$ | 56 | 0.02 | Film formation | 42.3 | 96.5 |
| Ex. 3 | Li(Ni$_{0.8}$Co$_{0.1}$Mn$_{0.1}$)O$_2$ | 91 | 0.02 | Film formation | 42.7 | 97.8 |
| Ex. 4 | Li(Ni$_{0.8}$Co$_{0.1}$Mn$_{0.1}$)O$_2$ | 82 | 0.01 | Film formation | 44 | 97.6 |
| Ex. 5 | Li(Ni$_{0.8}$Co$_{0.1}$Mn$_{0.1}$)O$_2$ | 80 | 0.04 | Film formation | 42.2 | 97.6 |
| Ex. 6 | Li(Ni$_{0.8}$Co$_{0.1}$Mn$_{0.1}$)O$_2$ | 81 | 0.06 | Film formation | 42.2 | 97.3 |
| Ex. 7 | Li(Ni$_{0.8}$Co$_{0.1}$Mn$_{0.1}$)O$_2$ | 81 | 0.07 | Film formation | 42 | 96.0 |

[1] The "boron ratio" refers to a percentage of an amount of substance of boron to a total amount of substance of metal elements other than lithium contained in the positive electrode active material and boron. "boron ratio (%) = {B/(Ni + Co + Mn + B)} × 100"
[2] The "CNT ratio" refers to a percentage of a mass of CNT to a mass of the positive electrode active material.

<Results>

As seen in Table 1 above, in Comparative Example 1 and Comparative Example 2, for example, forming a film tends to enhance cycle life. Forming a film also tends to increase battery resistance.

In Comparative Example 1 and Comparative Example 4, for example, adding CNT tends to reduce battery resistance. Adding CNT alone tends to cause no substantial change in cycle life.

In Comparative Example 3, CNTs are mixed during positive electrode slurry preparation. Therefore, it is considered that the film of Comparative Example 3 does not have part of CNT buried therein. In Comparative Example 3, the boron ratio is 80%. In Comparative Example 3, the CNT ratio is 0.02%. In Comparative Example 3, the battery resistance is 44 mΩ.

In Example 4, CNTs are mixed during film formation. Therefore, it is considered that, in Example 4, part of CNT is buried in the film and the remaining part of CNT is exposed on a surface of the film. In Example 4, the boron ratio is 82%. In Example 4, the CNT ratio is 0.01%. In Example 4, the battery resistance is 44 mΩ. In Example 4, the boron ratio is high and the CNT ratio is low compared to Comparative Example 3. Therefore, it is considered that the battery resistance in Example 4 is higher than the battery resistance in Comparative Example 3. It should be noted that Example 4 and Comparative Example 3 have the same battery resistance. It is considered that, in Example 4, compared to Comparative Example 3, an increase in resistance resulting from film formation is efficiently reduced.

In Example 1 to Example 7, when the boron ratio is 80% or higher, the cycle life (capacity retention) tends to be enhanced.

In Example 1 to Example 7, when the CNT ratio is 0.02% or higher, battery resistance tends to be low, and when the CNT ratio is 0.06% or lower, the capacity retention tends to be high.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A non-aqueous electrolyte secondary battery comprising a positive electrode material,
   the positive electrode material consisting of composite particles,
   each of the composite particles including a base material particle, a film, and a carbon nanotube,
   the film covering at least a part of a surface of the base material particle,
   the base material particle including a positive electrode active material, the positive electrode active material comprising $LiMeO_2$, Me denotes one or more metallic elements,
   the film including a boron oxide,
   the carbon nanotube including a first portion and a second portion,
   the first portion being buried in the film,
   the second portion being exposed on a surface of the film,
   wherein a percentage of an amount of substance of boron to a total amount of substance of metal elements other than lithium contained in the positive electrode active material and boron measured by x-ray photoelectron spectroscopy is 80% or higher,
   wherein a percentage of a mass of the carbon nanotube to a mass of the positive electrode active material is from 0.02% to 0.06%,
   wherein a capacity retention of the non-aqueous electrolyte secondary battery is greater than or equal to 97.3%, wherein the capacity retention is a percentage of a $100^{th}$ cycle discharged capacity to a $1^{st}$ cycle discharged capacity, and
   wherein a battery resistance of the non-aqueous electrolyte secondary battery is less than or equal to 42.7 mΩ.

2. The non-aqueous electrolyte secondary battery of claim 1, wherein a diameter of the base material particle is from 1 μm to 30 μm.

3. The non-aqueous electrolyte secondary battery of claim 1, wherein the boron oxide comprises Li.

4. The non-aqueous electrolyte secondary battery of claim 1, wherein the boron oxide is amorphous.

5. The non-aqueous electrolyte secondary battery of claim 1, wherein the positive electrode active material comprises $LiNi_{0.8}C_{00.1}Mn_{0.1}O_2$.

6. The non-aqueous electrolyte secondary battery of claim 1, wherein the capacity retention of the non-aqueous electrolyte secondary battery is from 97.3% to 98.0%.

7. The non-aqueous electrolyte secondary battery of claim 1, wherein the battery resistance of the non-aqueous electrolyte secondary battery is from 42.2 mΩ to 42.7 mΩ.

8. The non-aqueous electrolyte secondary battery of claim 1, wherein the positive electrode active material comprises $LiNi_aCo_bMn_cO_2$, wherein $0.7<a<1$, $0<b<0.3$, $0<c<0.3$, and $a+b+c=1$.

9. A method of producing a non-aqueous electrolyte secondary battery comprising a positive electrode material, comprising:
   mixing a base material particle, boric acid, a carbon nanotube, and a solvent to prepare a first precursor;
   drying the first precursor to prepare a second precursor; and
   heating the second precursor to prepare a composite particle,
   the non-aqueous electrolyte secondary battery comprising the positive electrode material consisting of the composite particles,
   each of the composite particles including the base material particle, a film, and the carbon nanotube,
   the film covering at least a part of a surface of the base material particle,
   the base material particle including a positive electrode active material, the positive electrode active material comprising $LiMeO_2$, Me denotes one or more metallic elements,
   the film including a boron oxide,
   the film being formed in such a way that the carbon nanotube includes a first portion and a second portion,
   the first portion being buried in the film,
   the second portion being exposed on a surface of the film,
   wherein a percentage of an amount of substance of boron to a total amount of substance of metal elements other than lithium contained in the positive electrode active material and boron measured by x-ray photoelectron spectroscopy is 80% or higher,
   wherein a percentage of a mass of the carbon nanotube to a mass of the positive electrode active material is from 0.02% to 0.06%, wherein a capacity retention of the non-aqueous electrolyte secondary battery is greater than or equal to 97.3%, wherein the capacity retention is a percentage of a $100^{th}$ cycle discharged capacity to a $1^{st}$ cycle discharged capacity, and wherein a battery resistance of the non-aqueous electrolyte secondary battery is less than or equal to 42.7 mΩ.

* * * * *